Patented Nov. 10, 1953

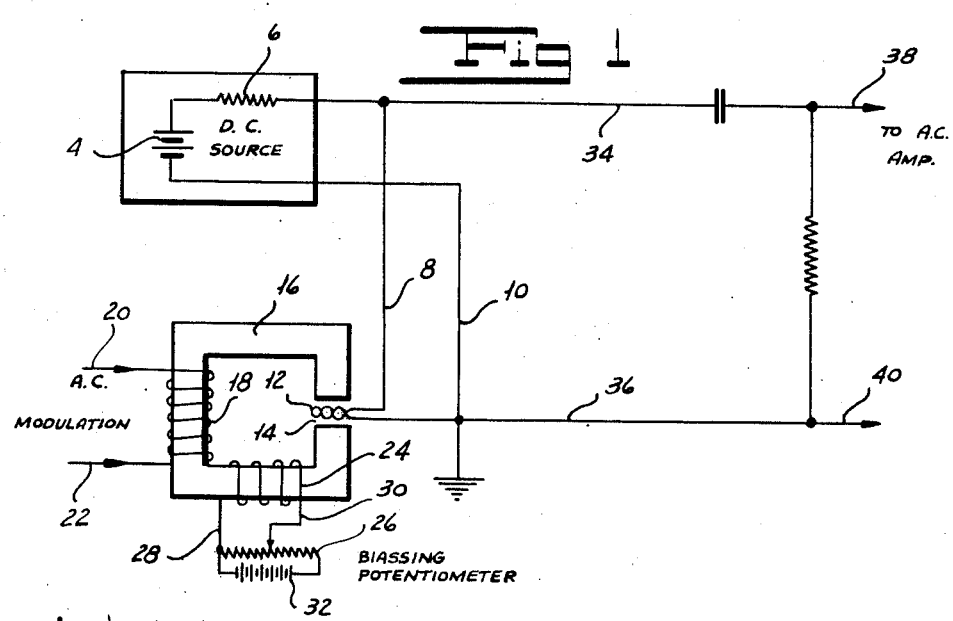
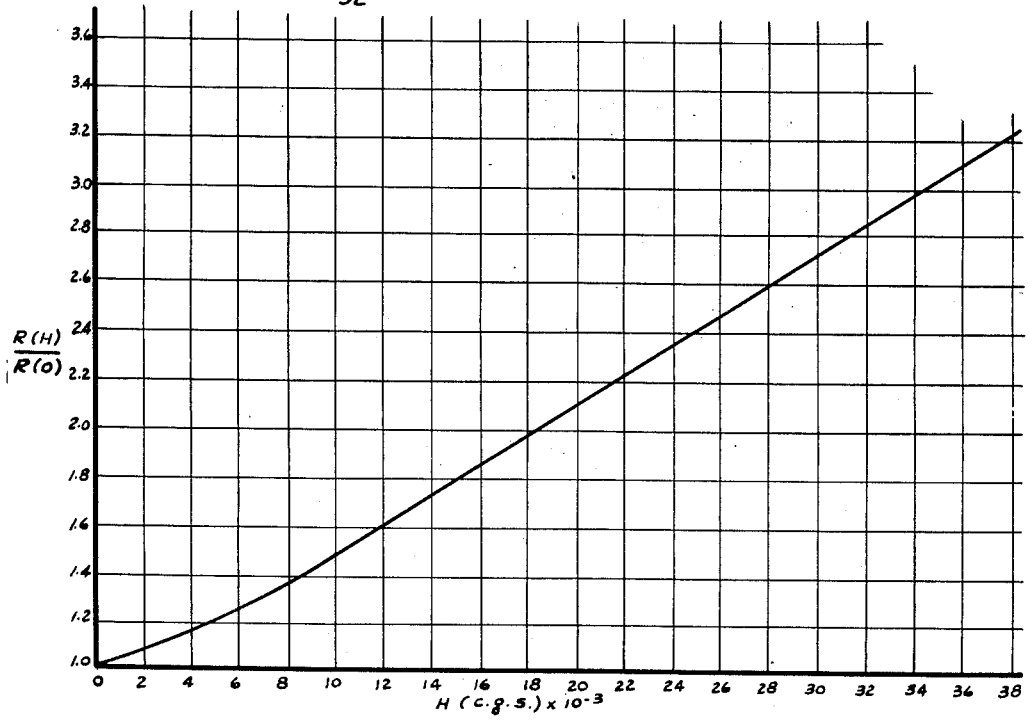

2,659,043

UNITED STATES PATENT OFFICE 2,659,043

APPARATUS FOR CONVERTING DIRECT CURRENT INTO ALTERNATING CURRENT

James E. Taylor, New York, N. Y., assignor to The Norden Laboratories Corporation, White Plains, N. Y., a corporation of Connecticut Application October 1, 1949, Serial No. 119,050

12 Claims. (Cl. 321—45)

My invention relates to a method and apparatus of converting direct current into alternating current, and more particularly to a means and method whereby a uni-directional current of small potential is converted into alternating current, which may be then amplified and used to control various instrumentalities.

A thermionic tube is a convenient method for converting alternating current into direct current when it is connected as a detector or rectifier. Similarly, alternating current may be converted into direct current by means of other rectifiers. There are many occasions where a signal is produced which is represented by a small uni-directional potential. This potential is so small that it cannot be employed conveniently to control various instrumentalities. A direct current cannot be amplified by transformers or thermionic tubes in the same manner as alternating current.

The methods known to the art for converting direct current into alternating current have many disadvantages. One such method is, for example, a vibrator or chopper which employs moving parts subject to wear and is expensive to construct. The use of an oscillator having a control grid to which the direct current signal is applied is expensive to construct, and oscillators are difficult to control and hence cannot be used in computors where it is desired to obtain a signal exactly in phase with the original signal but of larger amplitude.

One object of my invention is to provide an improved method of converting a uni-directional potential into an alternating potential in phase therewith, which alternating potential may then be amplified by conventional amplifiers to produce a signal of increased magnitude which may be then employed for any desired purpose, such as controlling a servomotor, for use in electronic computors and the like.

Another object of my invention is to provide an improved apparatus for converting direct current into alternating current in a distortion free manner.

Another object of my invention is to provide an improved apparatus for converting direct current into alternating current in a simple, convenient, expeditious and inexpensive manner, in which no moving parts are employed.

Other and further objects of my invention will appear from the following description.

In the accompanying drawings which form part of the instant specification and which are to be read in conjunction therewith, Fig. 1 is a diagrammatic view showing apparatus embodying my invention and capable of carrying out the method of my invention.

Fig. 2 is a curve showing resistance plotted against magnetic field of a bismuth conductor.

There are many conductors known to the art whose resistance varies as a function of the magnetic field strength in which they are disposed. One such conductor is the metal bismuth, which is obtained chiefly as a by-product in the refining of lead and copper. It is also obtained from the mineral bismuthinite. The metal itself is grayish white in color with a reddish tinge, and is very brittle. It is the most diamagnetic of all the metals. F. Kohlrausch, in "Praktische Physik," page 603, described the property of bismuth of varying its resistance in accordance with the variation of a magnetic field in which it was placed. J. B. Henderson, in "Annalen der Physik u. Chemie," volume 53, pages 912 to 923, described this action in 1894.

Referring to Fig. 2, the curve of variation of resistance of a spiral bismuth wire in a magnetic field from zero to thirty-eight thousand gauss is shown. R(O) was 8.75 ohms. The observations were taken at a temperature of 18° centigrade. It will be seen, for example, that at twenty-eight thousand gauss the resistance of the bismuth conductor was 22.1 ohms, and that at about thirty-four thousand gauss the resistance of the bismuth wire was increased by a factor of three.

Other materials exhibit a similar property. "Permalloy," an alloy of nickel and iron, produced by the Western Electric Company, is an example. It is an alloy of approximately 78.5% of nickel and 21.5% of iron, and sometimes contains impurities such as .04% carbon, .03% silicon, .37% cobalt, .10% copper, and .022% manganese. Sometimes minor amounts of chromium or molybdenum are present. This material has a low magnetic hysteresis.

The method of my invention comprises placing a non-inductive coil composed of a material whose resistance varies as a function of the magnetic field strength in an alternating current magnetic field and impressing the direct current signal across this coil. A modulating frequency may be of any desired value. A method of operation can be chosen to yield a principal frequency component either equal to the modulation frequency or double the modulation frequency. As the modulating field is symmetrical about the zero value, representing unbiased operation, the resistance will be maximum when the modulating field reaches its greatest positive or negative excursion. Thus for a single cycle of a sinusoidal modulating field the resistance will undergo two cycles, so that the principal output frequency is twice the modulating frequency. It can be shown analytically that if the resistance plotted against the field characteristic is parabolic this type of operation will yield a distortion-free double frequency output for a sinusoidal operation.

If, however, the modulating field is symmetrical about a point displaced from zero, representing biased operation, and if the peak amplitude of the modulation does not exceed the value of the biasing field, the principal component of output resistance variation will have a frequency equal to the modulating frequency. Accordingly, for biased operation, a distortion free output will result if the resistance versus field relation is linear.

Referring now to Fig. 1, any suitable source of a direct current signal may be employed in carrying out my invention. I have shown the direct current signal source as comprising a battery 4 and a resistor 6, which produces a direct current potential representing the desired direct current signal which is to be amplified and employed for any desired useful purpose. The direct current signal is impressed by conductors 8 and 10 across a non-conductive coil 12 formed of bismuth, Permalloy, or any appropriate conductor whose resistance will vary as a function of the magnetic field strength in which it is placed. For purposes of convenience, I will refer to this conductor as a "bismuth" conductor, though it is to be understood that any suitable material having the described property of changing its resistance as a function of the magnetic field strength in which it is situated may be employed. The bismuth coil 12 is positioned in a gap 14 of an armature 16 which may be made of Permalloy or any other suitable permeability alloy. A winding 18 is positioned about the core 16 and is connected by conductors 20 and 22 to any appropriate source of alternating current of any desired frequency which acts as a modulating current to modulate the magnetic field in which the bismuth coil 12 is positioned. A second coil 24 is wound around the core 16 and connected across a potentiometer 26 by means of conductor 28 and variable brush 30, the potentiometer being supplied potential from battery 32. The position of the brush 30 will bias the magnetic field in the gap 14 displacing it from zero magnetic field to produce a biased operation in which a distortion free output will result, in which the frequency of the output alternating current appearing across conductors 34 and 36 will be equal to the frequency of the modulation alternating current impressed upon the core 16 by conductors 20 and 22. The amplitude of bias should be such that it will be greater than the peak amplitude of the modulating alternating current.

The output signal appearing across conductors 34 and 36 is impressed by conductors 38 and 40 to an alternating current amplifier (not shown) and the amplified signal used for any desired purpose.

It will be seen that the apparatus shown in Fig. 1 may be used to convert the direct current of source 4 to an alternating current across conductors 38 and 40.

If an output frequency double that of the modulating current is desired, the potentiometer brush 30 is moved to coincide with conductor 28 freeing the core of any bias so that the modulating signal will then be symmetrical about the zero value of the magnetic field in which the bismuth coil 12 is placed. In this form of operation the frequency of the alternating current appearing across conductors 38 and 40 will be double the modulating frequency impressed on the coil 18 by conductors 20 and 22.

It will be seen that I have accomplished the objects of my invention. I have provided a novel method of converting direct current into alternating current in a simple, convenient and expeditious manner. My apparatus is inexpensive to construct and employs no moving parts. I am enabled to produce an alternating current from a direct current source, whose frequency equals the modulating frequency or is double the modulating frequency. The alternating potential resulting from the conversion may be amplified to produce an alternating potential of any desired amplitude.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. Apparatus for converting direct current into alternating current, including in combination a magnetic circuit, a bismuth conductor positioned in said magnetic circuit, circuit means including a voltage dropping resistor for impressing a uni-directional potential across said bismuth conductor, alternating means for modulating the magnetic flux flowing through said magnetic circuit whereby to vary the resistance of said bismuth conductor, and a pair of conductors connected across the bismuth conductor to remove the desired alternating current.

2. Apparatus for converting direct current into alternating current, including in combination a magnetic circuit, a bismuth conductor positioned in said magnetic circuit, circuit means including a voltage dropping resistor for impressing a uni-directional potential across said bismuth conductor, alternating means for modulating the magnetic flux flowing through said magnetic circuit whereby to vary the resistance of said bismuth conductor, and a pair of conductors connected across the bismuth conductor to remove the desired alternating current, one of said conductors having a capacitor connected in series therewith.

3. Apparatus as in claim 1 in which said bismuth conductor is wound in the form of a non-inductive coil.

4. Apparatus as in claim 1 in which said magnetic circuit comprises a core of a permeability alloy and said alternating means for modulating the magnetic flux comprises a winding disposed about said core.

5. Apparatus as in claim 1 in which said magnetic circuit comprises a core, a first winding disposed about said core, means for connecting said first winding across an alternating current potential, a second winding disposed about said core to bias the magnetic circuit, and means for impressing a direct current potential across said second winding.

6. Apparatus for converting direct current into alternating current, including in combination a direct current source, a conductor formed of a metal whose resistance varies as a function of the strength of the magnetic field, circuit means including a voltage dropping resistor for connecting said conductor across said direct current source, a magnetic circuit, said conductor being positioned in said magnetic circuit, alternating means for modulating said magnetic circuit, a pair of terminals connected across said conductor, the desired alternating current potential appearing across said terminals.

7. Apparatus as in claim 6 in which said conductor is wound in the form of a non-inductive coil.

8. Apparatus as in claim 6 in which said conductor is formed of bismuth.

9. Apparatus as in claim 6 in which said conductor is formed of "Permalloy."

10. Apparatus as in claim 6 in which a second resistor is connected across said terminals by a conductor and a capacitor, the desired alternating potential appearing across said resistor.

11. Apparatus as in claim 6 in which said magnetic circuit comprises a core having an air gap, said conductor positioned in said air gap, said alternating means comprises a winding disposed about said core, and means for connecting said winding to an alternating potential.

12. Apparatus as in claim 6 in which said magnetic circuit is provided with biasing means for raising the magnetic flux in said circuit to a predetermined value.

JAMES E. TAYLOR.

References Cited in the file of this patent

UNITED STATES PATENTS

| Number | Name | Date |
| --- | --- | --- |
| 543,843 | Biggar | Aug. 6, 1895 |
| 1,543,475 | Lemmon | June 23, 1925 |
| 1,596,558 | Sokoloff | Aug. 17, 1926 |
| 1,810,539 | Sokoloff | June 16, 1931 |
| 2,464,807 | Hansen | Mar. 22, 1949 |
| 2,482,820 | Wolfson et al. | Sept. 27, 1949 |

OTHER REFERENCES

Radio Amateur's Handbook, A. R. R. L., 1946, p. 78.